United States Patent Office 3,134,044
Patented May 19, 1964

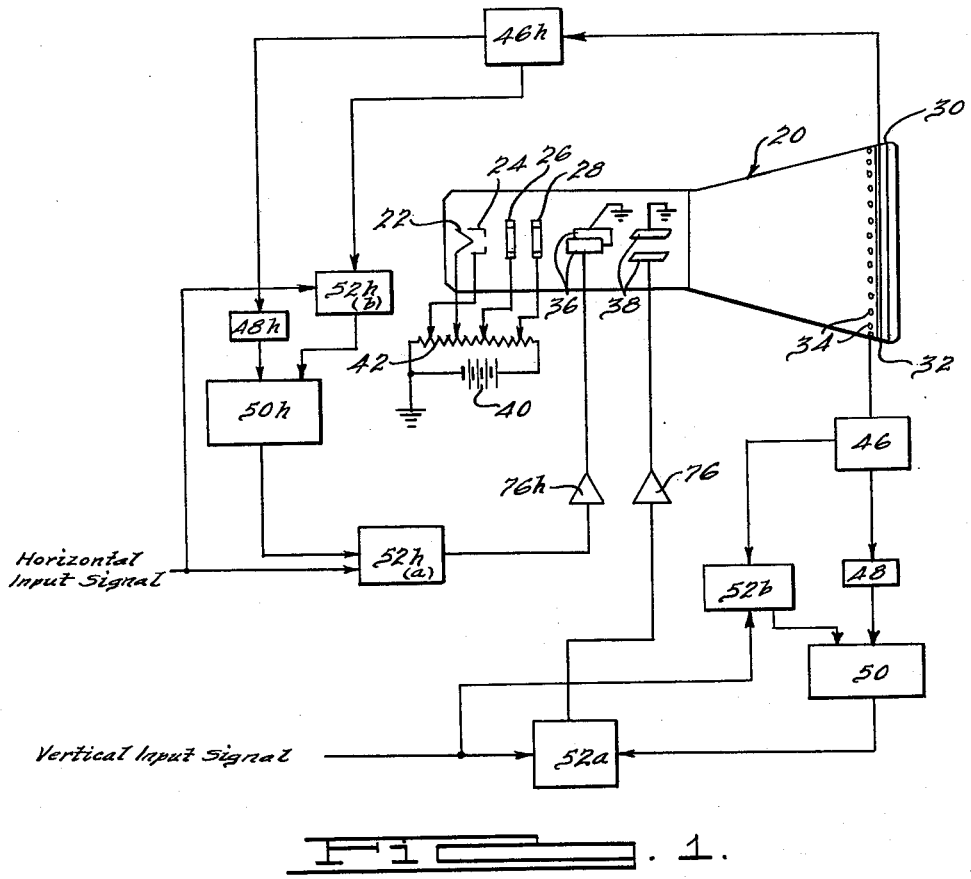
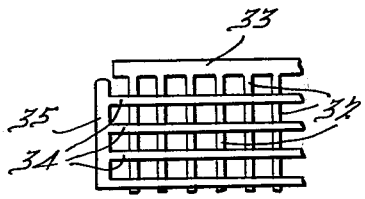

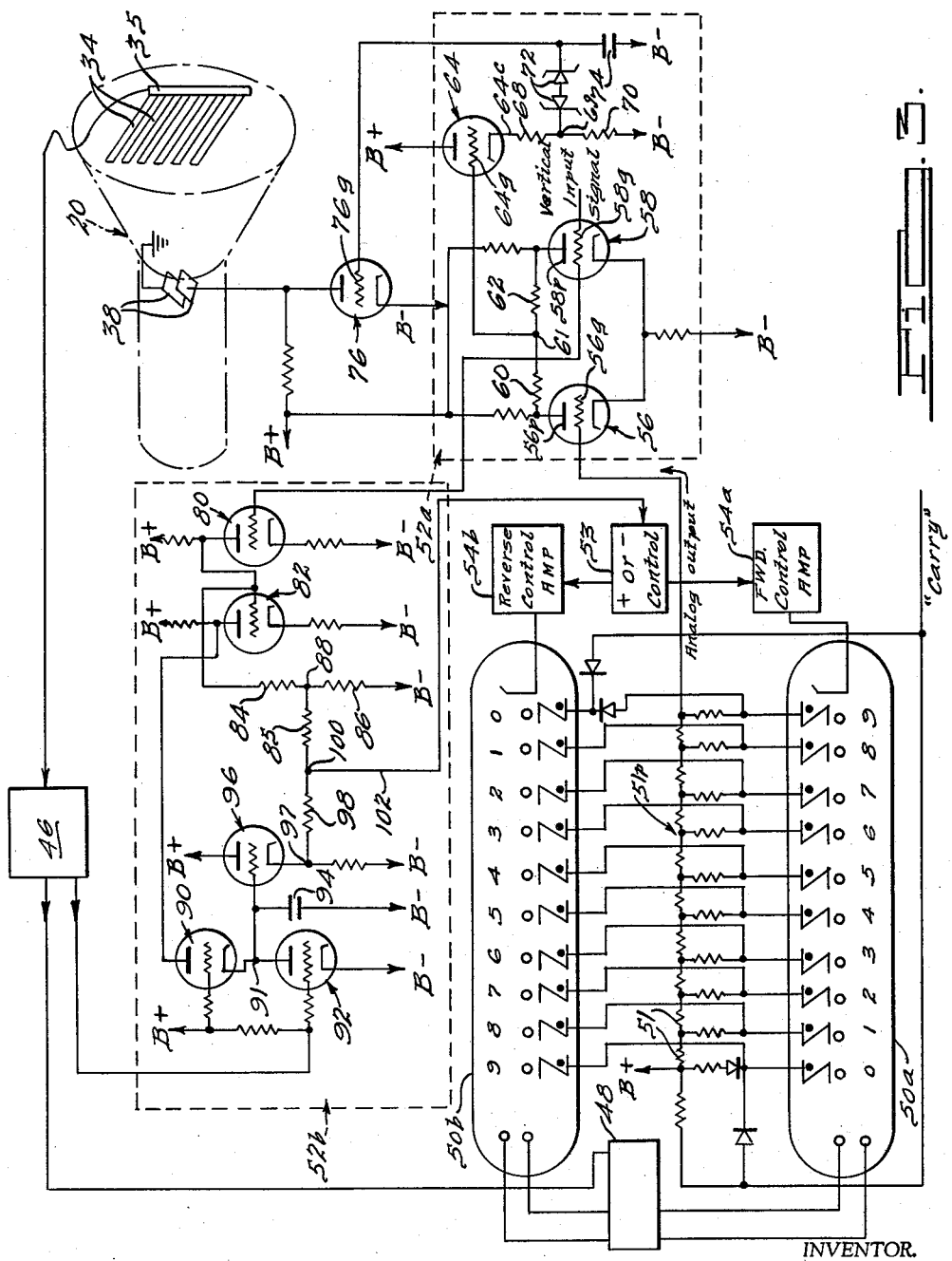

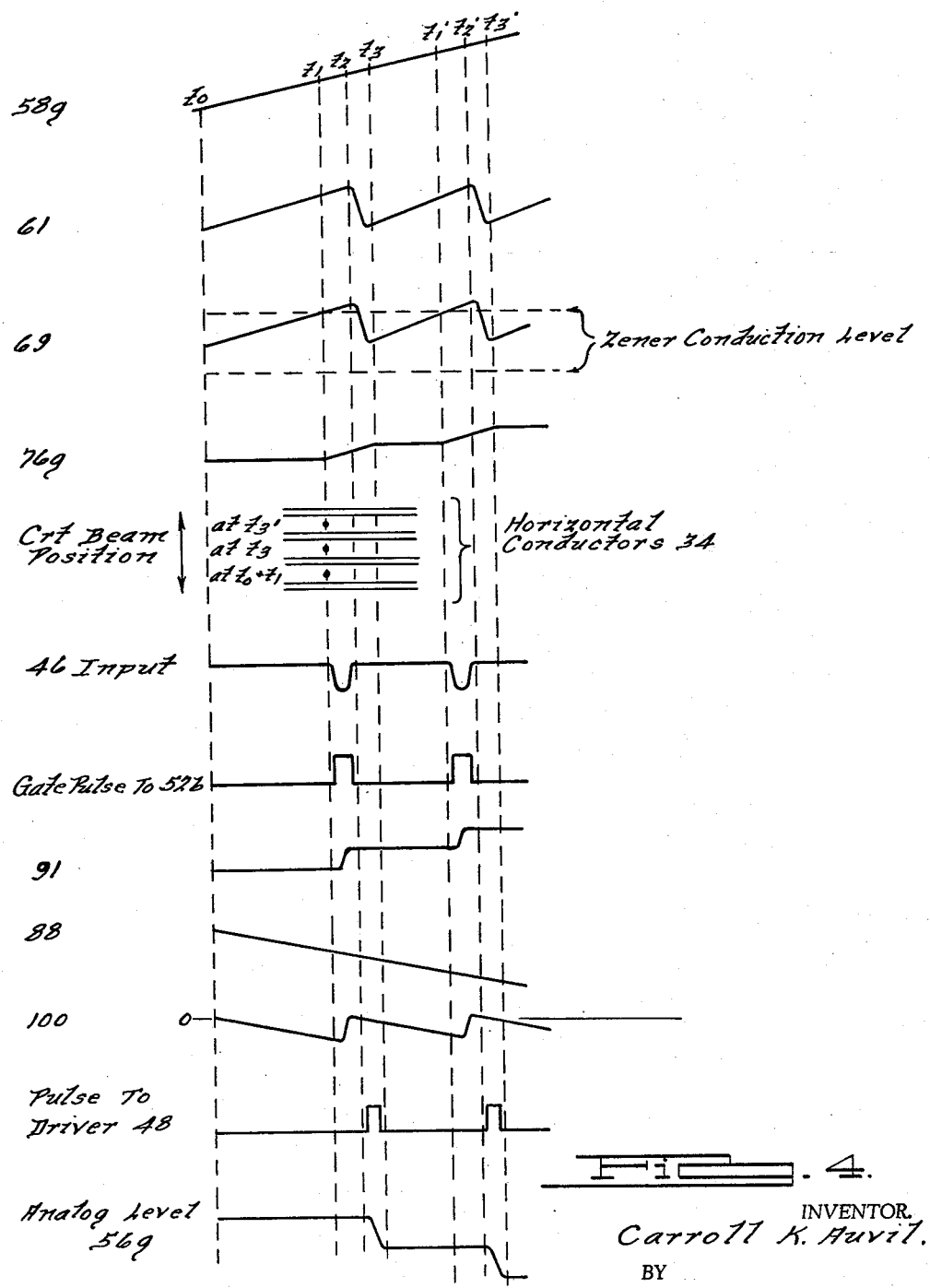

---

3,134,044
BEAM POSITIONING SYSTEM
Carroll K. Auvil, Romeo, Mich., assignor to Chrysler Corporation, Highland Park, Mich., a corporation of Delaware
Filed Feb. 26, 1962, Ser. No. 175,396
10 Claims. (Cl. 315—10)

This invention relates generally to a high energy beam positioning system and, more particularly, to an electron beam positioning system for cathode ray tubes in which a precise positioning system for the electron beam on the screen is required.

In cathode ray tubes, the cathode ray or beam of electrons is deflected selectively in accordance with the magnitude of an electrical input signal to the tube. There is a possibility in such devices that during the movement of the beam position on the screen, the positioning of the beam or the spot as it appears on the screen is subject to erroneous positioning. The error in positioning may result from mechanical or electrical limitations in the cathode ray tube, or from electrical disturbances inherent in the system during the sweeping cycle from a variety of causes.

It is an object of this invention to provide a beam positional feed-back control system in which the feedback is transmitted in digital form and converted to analog form for comparison with the input signal.

It is an additional object of this invention to provide a feed-back control system in which the accuracy is determined by the interposition of a mechanical grid structure.

It is a further object of this invention to provide a feed-back control system in which the accuracy is determined by the interposition of a mechanical grid structure which is normally electrically passive but is electrically activated by the impingement and movement of the beam.

It is a further object of this invention to provide a positioning feed-back system for a cathode ray tube in which the feed-back of incrementally derived digital form is utilized in an analog comparator to determine and compensate for the error existing between the feed-back pulse level and the input signal pulse level.

It is a still further object of this invention to provide a positioning feed-back system for a cathode ray tube in which the feed-back of incrementally derived digital form is utilized in analog comparators to determine both the amplitude and the polarity of the error existing between the feed-back pulse level and the input signal pulse level.

In accordance with the foregoing objects, the invention, first briefly described, includes a conductor grid mounted intermediate the deflection control plates of a cathode ray tube and the viewing screen thereof. A counter is electrically coupled between the conductor grid and an analog comparator. A deflection amplifier is electrically connected between the deflection plates and the analog comparator. The voltage on the deflection plates is altered in accordance with an error signal derived between the input signal and an analog output derived from the counter setting and directed to the comparator.

This invention with the above noted and other features thereof will be understood more clearly and fully from the accompanying drawings, in which:

FIGURE 1 shows a combined diagrammatic view of the cathode ray tube and a block diagram of the feed-back control system utilized therewith;
FIGURE 2 is a detail drawing of the conductor grid;
FIGURE 3 is a schematic drawing of the feed-back control system; and
FIGURE 4 is a voltage wave form diagram illustrating the mode of operation of the present invention.

Referring now to the drawings, the cathode ray tube in FIGURE 1 comprises an evacuated enclosing vessel 20 having at one end thereof an electron gun for projecting a concentrated electron beam toward the other end of the vessel. The electron gun is of a type well known in the art and includes a cathode 22, a control electrode 24, an accelerating electrode 26, and a focussing electrode 28. Mounted within the vessel 20 adjacent the other end thereof is a phosphor-coated viewing screen 30 which is adapted to receive and present a spot representative of the location of the electron beam on the screen. A set of plurality of vertically oriented, parallel and equally spaced conductors 32 are mounted inside and insulated from the phosphor-coated screen 30. A second set of horizontally oriented, parallel and equally spaced conductors 34 are mounted inside and insulated from conductors 32. Two pairs of deflection electrodes in the form of opposed pairs of plates in spaced quadrature are mounted adjacent the electron gun. The first pair of deflection plates 36 are operable to control the deflection of the electron beam in a horizontal direction in response to changes in voltage potential thereon. The second pair of deflection plates 38 are operable to control the deflection of the electron beam in a vertical direction in response to changes in voltage potential thereon.

As further shown in FIGURE 1, the electrodes comprising the electron gun are maintained at appropriate relative potentials by a battery 40 and a potentiometer 42 coupled thereto.

The components of the vertical beam positioning system include the conductors 34 and a pulse conditioner 46 which includes a pulse shaper and amplifier. As the electron beam crosses each horizontal conductor 34, it will generate a negative-going pulse therein. The action of each conductor 34 is essentially that of an electrode positive relative to the electron beam. The pulses generated in horizontal conductors 34 are shaped and amplified as required in pulse conditioner 46 in a manner well known in the electronic art and are then transmitted to the counter tube 50 and its associated driver 48. Counter 50 is a bidirectional type of counter whose detail will be illustrated and described in FIGURE 3 hereinafter. Polarity comparator 52b is coupled between pulse conditioner 46 and counter 50. Polarity comparator 52b controls the direction of counting in counter and, hence, the polarity of the error signal computed. Counter 50 has its output connected to an analog amplitude comparator 52a. Comparator 52a is adapted to receive the electrical input signal and compare it to the level of the output from counter 50. A correction voltage output or error signal representative of their difference, if any, is then generated and transmitted from comparator 52 to vertical deflection amplifier 76 to control the voltage on vertical deflection plates 38 and correct the location of the electron beam in accordance therewith. A similar system for the horizontal deflection plates 36 is illustrated which includes conductors 32, pulse conditioner 46h, counter driver 48h, counter 50h, analog comparator 52h (a), polarity comparator 52h (b), and horizontal deflection amplifier 76h. It is the function of the horizontal deflection control system to perform a corrective positioning of the electron beam in the horizontal direction. It will be observed that initial positioning and corrective positioning in the vertical and horizontal planes are accomplished independently of each other and through control systems essentially similar with respect to their components and mode of operation.

FIGURE 2 shows the detail of the conductor grid arrangement in which the horizontally arrayed conductors 34 and the vertically arrayed conductors 32 are mounted in a parallel manner with a separation from each other. Horizontal conductors 34 terminate in a common 35 and vertical conductors 32 terminate in a common 33. Commons 35 and 33 are electrically coupled to pulse conditioner units 46 and 46h, respectively.

FIGURE 3 shows schematically the major components of the vertical beam positioning system which is connected to the output from horizontal conductors 34 through their common 35. The counter 50 is of the bidirectional beam counter tube type, and utilizes complementary counter tubes 50a and 50b, each of which has a plurality of positive electrodes numbered 0–9 and ordered in the manner illustrated. Counter tubes 50a and 50b further have their positive electrodes coupled in parallel. Serially connected and coupled between the respective positive electrodes of tubes 50a and 50b are like-valued resistors 51 of potentiometer 51p. Pulses from conductors 34 are sequentially received through pulse conditioner 46 and advanced along the positive electrodes of counter tube 50a or 50b depending on the polarity of the last vertical input signal sampled relative to the current vertical input signal. The direction of counting, i.e., whether tube 50a or 50b counts is controlled in a manner well known in the art by a plus or minus control circuit 53 and by forward and reverse control amplifiers 54a and 54b operatively connected to the cathodes of counter tubes 50a and 50b, respectively. The variance of the operating voltage on plus or minus control circuit 53 and, consequently, the method of controlling the direction of counting in bidirectional counter 50 will be explained in connection with polarity comparator 52b hereinafter. It will be seen that the function of potentiometer 51p is that of transforming the digital setting of tubes 50a or 50b to an analog output voltage representative of the voltage output from horizontal conductors 34. While only one counter tube, the "units" tube, is provided for each direction of counting, it will be appreciated that, in conformance with the number of individual conductors 34 provided, "tens" and "hundred" counter tubes may also be utilized to provide the required counting capacity for the system. Only one tube 50a or 50b counts will be driven at one time by driver 48. The beam of the non-counting tube, when turned on, picks up where the other tubes left off because of the suppressed voltage condition in the last count position of any tube counting. Accordingly, if tube 50a is counting the analog output decreases, and, if tube 50b is counting the analog output increases.

FIGURE 3 further shows the components of analog comparator 52a and polarity comparator 52b. Amplitude comparator 52a includes a pair of triodes 56 and 58 coupled in tandem with a balance bridge comprising like-valued resistors 60 and 62 coupled across their plates 56p and 58p, respectively, in the manner shown. The control grid 56g of triode 56 is coupled to the analog output from potentiometer 51p associated with bidirectional counter 50. The control grid 58g of tube 58 is adapted to receive the vertical input signal which determines the electron beam positioning. Coupled to a point 61 intermediate resistors 60 and 62 is an isolation cathode follower tube 64, with its rate charging resistors 68 and 70. A pair of zener diodes 72 are coupled with reversed polarity in series with one plate of rate capacitor 74. Also connected to the upper plate of capacitor 74 is the control grid 76g of vertical deflection amplifier 76 which controls the voltage on vertical deflection plates 38. When the voltage on the grid 58g of tube 58 is fixed, one step of the analog input signal on the grid 56g of tube 56 will generate approximately the same voltage at point 61 as the self bias on zener diodes 72. An error signal will cause zener diodes 72 to conduct and start to charge or discharge the capacitor 74. As the voltage changes on capacitor 74, it will be reflected to the grid 76g of vertical deflection amplifier 76 and the deflection of the electron beam starts through the control of tube 76 and vertical deflection plates 38. When the analog output from potentiometer 51 is sufficient to cancel the voltage output at point 61, zener diodes 72 will again become nonconducting. As the point of balance is reached, the charging of capacitor 74 stops, and it remains at its new charged voltage value until zener diodes 74 again conduct. It will be seen that the function of the capacitor 74 in the circuit is to increase the deflection force as long as an unbalance exists in the comparator. After a balance condition exists between tubes 56 and 58, capacitor 74 serves to hold the required D.C. voltage to maintain the beam in its new position.

Polarity comparator 52b is utilized to sample and hold the vertical input voltage that was present at the grid 58g of tube 58 at the last pulse interval for comparison with the currently present vertical input signal. The polarity of the change must be sensed before sufficient voltage differential is developed in the amplitude comparator 52a to cause a deflection of the electron beam to occur. Polarity comparator 52b is operably connected through counter 50 to control the polarity of the signal applied to tube 56 of the amplitude comparator 52a. The polarity information is used to direct and appropriate direction of counting in bidirectional counter 50 when the first pulse from the conductor 34 arrives at the counting tubes. As has been previously indicated in connection with bidirectional counter 50, whether counter tube 50a or counter tube 50b counts is determined by the plus or minus control tube 53 which in turn is controlled by the output from polarity comparator 52b. Polarity comparator 52b includes an amplifier tube 80 and an isolation and phase inverter tube 82. The vertical input signal is taken from the grid 58g of tube 58, amplified in tube 80 and transmitted to a voltage divider comprising resistors 84 and 86 coupled at point 88. The output of tube 82 is transmitted to the plate of gating tube 90. Gating tubes 90 and 92 are in a normally nonconducting state. Capacitor 94 and the grid of cathode follower tube 96 are coupled to the plate of tube 92 and the cathode of tube 90. The output from the cathode of cathode follower 96 is transmitted through resistor 98, of a like value as resistor 85, to point 100. Lead 102 connects point 100 with the plus or minus control circuit 53 for bidirectional counter 50. It will be seen that tubes 90 and 92 function as a voltage divider. The voltage across capacitor 94 when charged to the voltage of point 91 will cause the voltage at point 97 to be the same as at point 88. Upon receipt of a vertical input signal, the voltage of point 100 will fluctuate in a manner proportional to the vertical input signal. Whenever a pulse is generated from conductors 34 and through pulse conditioner 46, the tubes 90 and 92 fire for the pulse duration, allowing capacitor 94 to charge and the voltage at point 91 to reach equilibrium with the proportional input voltage at point 88. When the pulse from 46 is extinguished, tubes 90 and 92 are cut off so that the circuit to capacitor 94 is opened. The voltage at point 97 remains fixed until receipt of the next pulse from 46. As the vertical input signal varies, the limitation on the amplitude comparator 52a requires it to vary a discrete amount before another pulse is generated. Variance in this discrete amount is sufficient for the plus or minus control circuit 53 to sense whether the voltage at point 88, and hence at point 100, is positive or negative with respect to the voltage at point 97. When the next pulse from 46 opens the gate comprising tubes 90 and 92, capacitor 94 charges to and holds the new vertical input signal level. Polarity comparator 52b thus samples and holds the input voltage present at the last pulse time on one side and the currently present input signal amplitude on the other side.

Description of Operation

In the operation of a conventional cathode ray tube, the visual trace by the electron beam of the electrical input voltage begins at one side of the screen from a point at which the proper bias voltages are maintained to cause the beam to remain there in a stationary position. As soon as vertical or horizontal input signals are introduced this balance is upset and the electron beam begins its movement. As the beam moves vertically, it intersects conductors 34 thus generating pulses and forwarding them to counter 50. Polarity comparator 52b determines the direction of counting in counter 50 and hence the polarity of the analog output signal from counter 50. When sufficient pulses have been generated in the counter 50 to restore a balanced level in the vertical amplitude comparator 52a between the counter output and the vertical input signal, the deflection plates 38 hold the beam in its corrected position.

The sequence of operations will be described with reference to the voltage wave form diagram of FIGURE 4. It should be noted that the representation of the cathode ray tube beam position has its time scale oriented on the ordinate rather than on the abscissa. At time $t_0$, the vertical input signal is being received at the grid 58g of tube 58. The electron beam remains in its original position between a pair of conductors 34. Therefore, no pulse has yet been generated to initiate the operation of polarity comparator 52b or counter 50. Gating tubes 90 and 92 are in their non-conducting state.

At time $t_1$ the voltage rise in the vertical input signal has been followed by a rise in voltage at points 61 and 69 until zener diodes 72 begin to conduct. Capacitor 74 and, hence, grid 76g reflect a voltage rise to change the voltage on deflection plates 38 to initiate movement of the electron beam. The vertical input voltage rise on 58g is reflected to point 88 and is summed at point 100 with the voltage at point 91 (or 97), or, otherwise stated, point 88 is compared in absolute magnitude but of opposite polarity at point 100 with the voltage at point 91 (or 97) of the last vertical input signal. The voltage at point 100 is summing these two values and this sum is transmitted through lead 102 to activate plus or minus control circuit 53 to condition the counter for counting in tube 50a.

Between $t_1$ and $t_2$ the electron beam has interrupted and crossed a grid conductor 34 to provide an output pulse to pulse conditioner unit 46 which is then inverted and transmitted as a gate pulse to polarity comparator 52b. Tubes 90 and 92 now conduct so that point 91 rises to the level of the vertical input signal. Voltage at point 100 returns to zero. By time $t_2$, the gate pulse to 52b has terminated, tubes 90 and 92 cease to conduct, and the voltage previously present at grid 58g is held by the action of capacitor 94 in readiness for the next polarity sampling.

Between $t_2$ and $t_3$, the delayed pulse to counter driver 48 initiates a one count in the direction predetermined by plus or minus control circuit 53. Accordingly, the analog output from potentiometer 51p has dropped as indicated by the voltage level at 56g of tube 56. This drop is communicated to points 61 and 69 until a balance exists between tubes 58 and 60. Zener diodes 72 cease to conduct. This opens the circuit to capacitor 74 which serves to hold the voltage at 76g constant and thereby maintain the electron beam in its first moved position as indicated at $t_3$. Between times $t_2$ and $t_3$, the vertical input signal at 58g continues to rise until zener diodes 72 again conduct. At time $t_1'$ movement of the beam is again initiated and this results in a repetition of the steps of operation described with relation to times $t_1$, $t_2$, and $t_3$ at times $t_1'$, $t_2'$, and $t_3'$.

For variations in the horizontal input signal, pulses are similarly generated in vertical conductors 32, until a balances are restored in the horizontal comparator 52h (a). Both the above processes may occur simultaneously in the operation of the cathode ray tube and at a high rate of speed limited only by the electronic circuitry involved. The displacement of the electron beam in a cathode ray tube having vertical and horizontal positioning systems of the type disclosed in the present application has an error determinable and controllable by the spacing of the vertical and horizontal conductors 32 and 34 in the grid on the screen 30. The conductors can be fabricated to any desirable tolerance and are both mechanically and electrically stable in their operation. Most cathode ray tube oscilloscopes incorporate the sweep technique with a reset to zero prior to each display operation of the electron beam. In normal sweep techniques, the counters 50 and 50h could be reset to any holding bias voltage preliminary to each sweep without altering any of the basic scope techniques.

The same technique and system used for precise positioning of electron beams in cathode ray tubes may be used in positioning any high energy beam so long as the grid provided has its members constructed of a material sensitive to the impingement of the beam so that a distinct output pulse will result therefrom responsive to each crossing of a grid member. In all such beam positioning systems, the utilization of the feedback system operable in digital form in accordance with the present invention provides an exceedingly high degree of accuracy.

It is evident that the specific embodiment of the invention shown and described is but illustrative and that various other modifications may be made therein without departing from the scope and spirit of the invention.

What is claimed is:

1. A precise positioning system for an energy beam comprising a plurality of parallel, equally-spaced control means interposed in the path of the beam, each of said control means operable to produce an electrical output pulse responsive to the impingement of the beam thereupon, counter means operatively connected to the output of said control means, means for transforming the setting of said counter into an analog output voltage, an analog amplitude comparator operatively connected to the output from said transforming means, adapted to receive an electrical input signal and operable to produce an error signal representative of their difference, deflection control means for the beam operatively connected to said comparator, said deflection control means initially operable to receive the input signal to move the beam and subsequently operable to reposition the beam in response to the error signal from said comparator, and a polarity comparator operatively connected to said amplitude comparator for determining the polarity of the error signal with reference to the preceding input signal.

2. A precise positioning system for an energy beam comprising a plurality of parallel, equally-spaced control means interposed in the path of the beam, each of said control means operable to produce an electrical output pulse responsive to the impingement of the beam thereupon, bi-directional counter means operatively connected to the output of said control means, means for transforming the setting of said counter into an analog output voltage, an analog amplitude comparator operatively connected to the output from said transforming means, adapted to receive an electrical input signal, and operable to produce an error signal representative of their difference, deflection control means for the beam operatively connected to said comparator, said deflection control means initially operable to receive the input signal to move the beam and subsequently operable to reposition the beam in response to an error signal from said comparator, and a polarity comparator electrically coupled intermediate said conductors and said amplitude comparator for determining the polarity of the error signal with reference to the preceding input signal, said polarity comparator being operatively connected to and controlling the direction of counting in said bi-directional counter.

3. A precise positioning system for an energy beam comprising a plurality of parallel, equally-spaced control means interposed in the path of the beam, each of said control means operable to produce an electrical output pulse responsive to the impingement of the beam thereupon, bi-directional digital counter means operatively connected to the output of said control means, a potentiometer connected in parallel with said digital counter, analog amplitude comparator means coupled to the output of said potentiometer, adapted to receive an electrical input signal, and operable to produce an error signal representative of their difference, deflection control means for the beam operatively connected to said comparator, said deflection control means initially operable to receive the input signal to move the beam and subsequently operable to reposition the beam in response to an error signal from said amplitude comparator, and a polarity comparator electrically coupled intermediate said conductors and said amplitude comparator for determining the polarity of the error signal with reference to the preceding input signal, said polarity comparator being operatively connected to and controlling the direction of counting in said bi-directional digital counter.

4. A precise positioning system for an energy beam comprising a plurality of parallel, equally-spaced control means interposed in the path of the beam, each of said control means operable to produce an electrical output pulse responsive to the impingement of the beam thereupon, bi-directional digital counter means operatively connected to the output of said control means, a potentiometer connected in parallel with said digital counter, analog amplitude comparator means coupled to the output of said potentiometer, adapted to receive an electrical input signal, and operable to produce an error signal representative of their difference, deflection control means for the beam operatively connected to said comparator, said deflection control means initially operable to receive the input signal to move the beam and subsequently operable to reposition the beam in a corrected position in response to the error signal from said amplitude comparator, a polarity comparator for determining the polarity of the error signal with reference to the preceding input signal, said polarity comparator being operatively connected to and controlling the direction of counting in said bi-directional counter, and means operably connected to said deflection control means for holding the beam in its corrected position.

5. An electron beam positioning system comprising a plurality of parallel, spaced conductors interposed transaxially to the path of the beam, said conductors having a uniform spacing greater than the cross-sectional area of the beam, a digital counter electrically coupled to said conductors and operable to receive a digital pulse output therefrom responsive to impingement of the beam on any of said conductors, potentiometer means operatively connected to said counter, a pair of spaced, variable voltage plates enclosing the beam and operable to position the beam initially in response to an input signal, and an analog comparator electrically coupled to said potentiometer means and adapted to receive the input signal, said comparator operable to transmit to said deflection control means an error signal which is a function of the difference between the output from said potentiometer means and the input signal.

6. A cathode ray tube comprising a projecting screen, a plurality of parallel, equally-spaced conductors mounted on and insulated from said screen, means for projecting an electron beam through said conductors and on said screen, deflection means for moving the beam across said screen in response to an electrical input signal, a digital counter electrically coupled to said plurality of conductors, a potentiometer connected in parallel with said counter, and analog comparator means coupled intermediate said potentiometer and said deflection means and adapted to receive the electrical input signal, said comparator operable to transmit to said deflection means an error signal which is a function of the difference between the output from said potentiometer and the input signal.

7. A cathode ray tube comprising a projecting screen, a plurality of parallel, equally-spaced conductors mounted on and insulated from said screen, means for projecting an electron beam in a direction intersecting said conductors and on said screen, a pair of variable voltage deflection plates mounted about the path of the beam and operable to move the beam responsive to an electrical input signal, a digital counter electrically coupled to said plurality of conductors, a potentiometer connected in parallel with said digital counter, analog comparator means coupled to the output from said potentiometer and adapted to receive the input signal, said comparator operable to transmit to said deflection plates an error signal which is a function of the difference between the output from said potentiometer and the input signal.

8. A cathode ray tube comprising a projecting screen, a plurality of parallel, equally-spaced conductors mounted on and insulated from said screen, means for projecting an electron beam in a direction intersecting said conductors, said conductors having a spacing greater than the cross-sectional dimension of the beam, a pair of variable voltage deflection plates mounted about the path of the beam and operable to move the beam responsive to an electrical input signal to provide a distinct output pulse of a single digital value from each of the conductors intersected, a counter electrically coupled to said plurality of conductors, transforming means operatively connected to said counter and operable to change its digital setting to an analog output, an analog amplitude comparator coupled to the output of said transforming means and adapted to receive an input signal, said amplitude comparator operable to transmit to said deflection plates an error signal which is a function of the difference between the voltage output from said transforming means and the input signal, and means operatively connected to said amplitude comparator for determining the polarity of the error signal with reference to the last prior input signal.

9. A cathode ray tube comprising a projecting screen, a plurality of parallel, equally-spaced conductors mounted on and insulated from said screen, means for projecting an electron beam in a direction intersecting said conductors and on said screen, a pair of variable voltage deflection plates mounted about the path of the beam and operable to move the beam responsive to an electrical input signal, a bi-directional digital counter electrically coupled to said plurality of conductors, a potentiometer connected in parallel with said digital counter, analog amplitude comparator means coupled to the output from said potentiometer and adapted to receive the input signal, said comparator operable to transmit to said deflection plates an error signal which is a function of the difference between the output from said potentiometer and the input signal, and a polarity comparator electrically coupled intermediate said conductors and said amplitude comparator for determining the polarity of the error signal with reference to the last prior input signal, said polarity comparator being operatively conected to and controlling the direction of counting in said bi-directional counter.

10. A cathode ray tube comprising a projecting screen, a plurality of parallel, equally-spaced conductors mounted on and insulated from said screen, means for projecting an electron beam in a direction intersecting said conductors and on said screen, a pair of variable voltage deflection plates mounted about the path of the beam and operable to move the beam responsive to an electrical input signal, a potentiometer, a bi-directional counter comprising a pair of beam switching tubes having their plates connected in parallel with said potentiometer and serially connected to said conductors, an analog amplitude comparator coupled to the output from said potentiometer and adapted to receive an input signal, said amplitude comparator operatively connected to and operable to transmit to said deflection plates an error signal which is a function of the difference between the output from said potentiometer and the input signal, and a polarity comparator operatively connected to said bi-directional counter to control the direction of counting and operatively connected to said amplitude comparator to control the polarity of the error signal with reference to the last prior input signal.

References Cited in the file of this patent
UNITED STATES PATENTS

| | | |
|---|---|---|
| 2,855,539 | Hoover | Oct. 7, 1958 |
| 2,855,540 | Hoover et al. | Oct. 7, 1958 |